United States Patent [19]

Braatz

[11] 4,377,068
[45] Mar. 22, 1983

[54] STATOR FOR A HYDRODYNAMIC TORQUE CONVERTER

[75] Inventor: Andreas Braatz, Rutescheim, Fed. Rep. of Germany

[73] Assignee: Daimler-Benz Aktiengesellschaft, Stuttgart, Fed. Rep. of Germany

[21] Appl. No.: 122,074

[22] Filed: Feb. 15, 1980

[30] Foreign Application Priority Data

Feb. 15, 1979 [DE] Fed. Rep. of Germany ....... 2905738

[51] Int. Cl.³ .............................................. F16H 41/04
[52] U.S. Cl. ......................................... 60/342; 60/356
[58] Field of Search ................. 60/342, 345, 352, 353, 60/354, 356, 362; 415/23, 62, 166

[56] References Cited

U.S. PATENT DOCUMENTS 2,205,794  6/1940  Jandasek ............................... 60/342
2,351,516  6/1944  Jandasek ........................... 60/354 X
2,755,628  7/1956  Mamo ................................... 60/356
3,934,414  1/1976  Merkle et al. ..................... 60/356 X

FOREIGN PATENT DOCUMENTS

616042  7/1935  Fed. Rep. of Germany ........ 60/354

Primary Examiner—Gerald A. Michalsky
Attorney, Agent, or Firm—Paul M. Craig, Jr.

[57] ABSTRACT

A stator construction for hydrodynamic torque converters with the stator construction including a plurality of stator blades fixedly arranged on a supporting hub. A supporting hub is adapted to be non-rotatably fixed in a reactionary direction of rotation of the torque converter. At least one additional stator blade is arranged between two neighboring fixed stator blades and guided movably on the supporting hub along a path of revolution concentric to the wheel axis between a central partial load position and a clutch position in the proximity of one of the fixed stator blades lying at the rear with respect to the reactionary direction of rotation.

34 Claims, 19 Drawing Figures

STATOR FOR A HYDRODYNAMIC TORQUE CONVERTER

The present invention relates to a hydrodynamic torque converter and, more particularly, to a stator construction for a hydrodynamic torque converter wherein stator blades are fixedly arranged on a supporting hub which can be non-rotatably fixed in position in a reactionary direction of rotation.

In order to meet the characteristic curve in the design of the power transmission properties of a hydrodynamic torque converter, it is necessary to satisfy mutually contrary requirements. More particularly, in the clutch range of operation of the hydrodynamic torque converter, a high degree of efficiency and a high power input are required to attain an advantageous fuel consumption and to minimize or maintain the heat losses at a small level. On the other hand, in the start up range of operation of the hydrodynamic torque converter, it is required that the conversion rate must be high and the rate of power input must be adapted to the drive engine to which the hydrodynamic torque converter is connected.

The reason the above-noted requirements are in opposition resides in the fact that the stator of the hydrodynamic torque converter is exposed, in the clutch point range and in the start up range due to an afflux or a flow at varying flow angles, and the stator profile should, on the one hand, exhibit satisfactory deflection or guiding properties while, on the other hand, in the clutch point range maximally low flow resistances for high power input and degrees of efficiencies. In order to exhibit satisfactory deflection or guiding properties, the stator profile must have a maximally large profile curvature and a narrow pitch; whereas, to have maximally low flow resistance, the stator blades do not have to meet any special deflection requirement but must exhibit low profile losses and a large blade pitch or spacing.

In order to attempt to satisfy the above-noted requirements, it has been proposed to displace the respective individual stator blades about a pivot axis perpendicularly to an axis of the guide wheel. However, such proposal is disadvantageous since it requires the use of operating and control means which increases the overall expenditure of the hydrodynamic torque converter.

The aim underlying the present invention essentially resides in satisfying the above-noted requirements without requiring the use of expensive operating and control means.

In accordance with advantageous features of the present invention, the stator blade is arranged between two neighboring fixed stator blades and is guided movably on the supporting hub along a path of revolution concentric to the wheel axis between a central partial load position and a clutch position in proximity to one of the fixed stator blades lying at the rear, as viewed in a reactionary direction of rotation.

The present invention is based on the general principal of disposing one of several stator blades so as to be movable and then utilizing the change in flow direction of the hydraulic fluid between the start up and clutch ranges so that the movable stator blades adjust themselves automatically with respect to the fixed stator blades. The movement of the movable stator blades due to the change in direction in which the pressure or stream of hydraulic fluid is effective results in a change in the pitch of the stator blades between a partial load position with a small blade pitch in the start up range and a clutch position with a large blade pitch in the clutch range.

In accordance with the present invention, the adjustment of the stator blades is automatically effected by the stream of the hydraulic fluid. In the start up range or zone of the hydrodynamic torque converter, the blade profiles are exposed to the flow of hydraulic fluid with the fluid impacting against a hollow of the blade so that the movable stator blades adjust themselves against a stop in the partial load position with a small blade pitch. In the clutch range or zone of the hydrodynamic torque converter the entering flow angle of the hydraulic fluid in front of the stator has changed so that the stator blades are exposed to a flow of the hydraulic fluid with the impact of the hydraulic fluid being against the crest of the blade whereby the movable stator blades, under the effect of the stream of hydraulic fluid, contact the fixed stator blades in a fan-like manner. By virtue of this arrangement, the blade pitch can be greatly enlarged by providing a greater proportion of movable stator blades. Moreover, the hydraulic losses of the blade pair formed by a fixed stator blade and movable stator blade with crest impact are less than the losses of two separate blades.

In accordance with the present invention, the position of the change over point within the hydrodynamic torque converter operating range at which the blade pitch is changed influences the course of the characteristic curve considered in the design of the transmission properties of a hydrodynamic torque converter. More particularly, the fan-like contacting of the movable stator blades against the fixed stator blades in front of the clutch point or range is dependent primarily on the afflux angle and thus on the pressure distribution of the blade surfaces.

By the constructional measures of the present invention, the switching point of the hydrodynamic torque converter can be shifted within a certain range. If the movable stator blade is supported by means of resilient elements in a direction of the clutch position against the supporting hub, then the position of the change over point can be effected by a corresponding dimensioning of the resilient elements.

According to the present invention, the pressure distribution on the blade surface may also be influenced by an appropriate configuring of the profile, especially the shape of the profile lug. The position of the change over point can also be affected by adapting the staggering angle to the afflux conditions of the hydraulic fluid with an appropriate blade twist.

In accordance with further advantageous features of the stator construction of the present invention, the blade hollow of the movable stator blade is adapted to the blade crest of the rearward fixed stator blade and these corresponding blade surfaces operate as a stop and counterstop for the clutch position. By virtue of these constructional features, separate stops and counterstops for the clutch position may be omitted. Additionally, hydraulic losses in the clutch range may be kept at a low value by providing that the movable stator blade, in its clutch position, hugs or engages the profile of the fixed stator blade in a hydraulically advantageous manner.

Frequently, it may be sufficient with the stator construction of the present invention to arrange, for the start up range of the hydrodynamic torque converter the movable blades so that they are supported, in the partial load position, rigidly with respect to the supporting hub.

In accordance with the present invention, it is possible to mount the movable stator blade in a guide groove on the supporting hub with the guide groove enabling the movable stator blade to execute an adjusting motion between a partial load range and the clutch range.

If several movable stator blades are to be provided, advantageously in accordance with the present invention, the movable stator blades are mounted on a shroud ring guided with limited movability with respect to the supporting hub.

To enable an advantageous construction for the mounting and supporting of the movable stator blade in accordance with the present invention, a shroud ring holding the movable stator blade is guided at in one direction of the wheel axis on a shroud ring fixedly disposed with respect to the supporting hub. Additionally, the movable stator blade may be mounted on a hub which is guided with limited rotatability on the supporting hub.

Additionally, in accordance with the present invention, the movable hub may be guided in one direction of the wheel axis by means of a shoulder-like extension of the supporting hub and guided in the other direction of the wheel axis by a mounting ring provided on the supporting hub.

To adapt the hydrodynamic torque converter to a charged drive engine, varying requirements result with respect to the characteristic curve of the hydrodynamic torque converter. More particularly, on the one hand, a low fixed braking speed is desireable while, on the other hand, a corresponding start up characteristic must be ensured in the partial load range. These requirements are advantageously fulfilled by a torque converter having a variable power input rate in the start up range.

In the stator construction of the present invention, a desired change in the power input rate in the start up range is advantageously attained in that the movable stator blade can be moved along its path of revolution into a full load position in the proximity of the other fixed stator blade which is forward, as viewed in the reactionary direction of rotation, and that the stop for the partial load position operates in dependence upon the reaction moment on the supporting hub and is brought into a release position, corresponding to the full load position, producing the movement of the movable stator blade in a direction toward a full load position if the reaction moment exceeds a predetermined value.

In the partial load range, the stator is traversed by the stream of hydraulic fluid at speeds which are low as compared with the full load range. The movable stator blades are in the partial load position so that the stator has the smallest blade pitch and the stator blades, in dense arrangemnt, throttle the stream of hydraulic fluid and thus reduce the power input of the torque converter. With an increasing load on the hydrdynamic torque converter, the movable stator blades are displaced into their full load position whereby the stator exhibits through flow conditions which are considerably altered as compared to the partial load range with respect to, for example, pressure loss coefficients and efflux angle thereby leading to correspondingly high power input in the start up range.

In the operating range of the clutch point with a stator construction in accordance with the present invention, the afflux angle is altered again whereby the movable stator blades are placed by pressure of the flow of the hydraulic fluid into their oppositely located clutch position and the pressure dependent stop for the partial load position is without effect for this direction of movement. In this operating range, the stator with a large blade pitch has low pressure losses leading to a high degree of efficiency and a high power input of the hydrodynamic torque converter.

To enable making the stop for the partial load position dependent upon the pressure in the stator, in accordance with the present invention, resilient means such as, for example, compression springs, are inserted operatively between the stop for the partial load position of the movable stator blade and the supporting hub.

In accordance with yet additional features of the present invention, the blade crest of the movable stator blades is adapted to the blade hollow of the neighboring stator blade which is forward, as viewed in the reactionary direction of rotation, and these corresponding blade surfaces operate as a stop and counterstop for the full load position. By virtue of such constructional features, special stops and counterstops for the full load position are again avoided and a hugging of the movable stator blades with respect to the neighboring stator blade is obtained at the full load position thereby reducing hydraulic losses.

While the above-noted stator constructions of the present invention provide for two different blade pitches by the adjustment of the movable stator blades between a partial load and clutch positions, it is possible to provide at least one further blade pitch by arranging two or more movable stator blades between two fixed stator blades so as to exhibit mutually offset partial load positions. More particularly, a movable stator blade located forward in the reactionary direction of rotation is movably guided on the supporting hub between a movable stator blade located rearwardly in the reactionary direction of rotation and the fixed stator blade located forwardly in the reactionary direction of rotation, and which blade is furthermore guided along a path of revolution concentric to the wheel axis between a central partial load position located offset with respect to the partial load position of the rearward movable stator blade in the reactionary direction of rotation and a clutch position in proximity of the rearward fixed stator blade.

Advantageously, in accordance with the present invention, it would be possible to move the forwardly disposed movable stator blade with increasing load into a full load position to vary the power input of the hydrodynamic torque converter in the start up range. However, in many cases, it is sufficient to rigidly support the forward movable stator blade with respect to the supporting hub in the partial load position.

In accordance with yet further advantageous features of the stator construction of the present invention, with three different blade pitches, the blade hollow of the forward movable stator blade is adapted to the blade crest of the proximate rearward movable stator blade with these corresponding blade surfaces serving as stop and counterstop for the clutch position of the forward movable stator blade. By virtue of these features, separate stops and counter stops for the clutch position of the forward movable stator blade are again avoided and, for reducing the hydraulic losses, the forward movable stator blade is made to hug the rearward movable stator blade.

By the rigid support of the forward movable stator blade on the supporting hub in the partial load position the rearward movable stator blade may be supported on the supporting hub, in its full load position, by way of the forward movable stator blade. By these features it is possible to dispense with stops and counterstops for the full load position of the rearward movable stator blade.

For positive guidance of the forward movable stator blade, the supporting hub may be provided with corresponding guide grooves. Advantageously, the forward movable stator blade is mounted on an annular blade carrier which is rotatable within limits with respect to the supporting hub but is arranged essentially immovably in the directions of the wheel axis. The forward movable stator blade may be mounted on a narrower hub and the rearward movable stator blade may be mounted on a wide shroud ring. With a drum being mounted non-rotatably with respect to the supporting hub to receive a free wheel clutch, the hub may be supported on the drum. These features regarding the mounting and support are advantageous, in particular, for the provision and mounting of several forward movable stator blades.

It is also possible in accordance with the present invention to arrange at least one of the movable stator blades to be additionally pivotable with respect to an axis extending at right angles to the axis of the guide wheel. To avoid the expenditure for bearings required for this purpose, it is advantageous for the at least one movable stator blade to be arranged between two neighboring fixed stator blades to have a uniform stagger angle.

Advantageously, the stator angle of the at least one movable stator blades arranged between two neighboring fixed stator blades is not equal to the stagger angle of the fixed stator blades whereby the possibility is provided to obtain, for a desired operating range of the converter, for example, the start up range, a reduction of the power input by decreasing the geometric efflux angle of the movable stator blade with respect to the geometric efflux angle of the fixed stator blade, or to obtain an increase in the power input by enlarging the geometric efflux angle of the movable stator blade with respect to the geometric efflux angle of the fixed stator blade. In this arrangement, it is assumed that the blade profile is not variable so that a change in the geometric efflux angle is attained by a corresponding change of the staggering angle.

Advantageously, a stator having varying blade pitches, to obtain hydraulically favorable uniformly constructed total lattice networks of movable and fixed stator blades, at least one of the movable stator blades arranged between the two neighboring fixed stator blades lies in the lattice work of the fixed stator blades.

In the stator construction of the present invention with the stator blades movable into a full load position, the alternating contacting of these blades against the hollow or crest side of the respective two neighboring fixed stator blades is made more difficult by the difference in pitch between the hub and the shroud ring. By differing inclination and profile construction of the two fixed stator blades, this difference in pitch can be equalized and thus an alternating contacting of the movable stator blade in the clutch position and in the full load position can be made possible.

According to the present invention, a fixed stator blade is proximate, in one peripheral direction of the wheel axis, to a movable stator blade and, in the other peripheral direction, to a further fixed stator blade. By this construction, the arrangement of two fixed stator blades is made possible which stator blades are proximate to each other in the peripheral direction but are of different configuration whereby the difference in pitch is equalized and thus the alternating contacting of the movable stator blade in the clutch position and the full load position is possible.

In the stator construction of the present invention, the respective movable stator blade must be in its partial load position in the start up range to produce the required conversion. Without any further measures, the movable stator blade would be urged into its clutch position only at relatively high speed ratios because only at such point in time is the afflux direction obtained which is required for this blade adjustment. However, a dropping course of the power input curve over the speed ratio can undesireably result, that is, the power input may be too low in the operating range between the partial load position and the change over point at which the movable stator blade passes over into the clutch position.

However in order to avoid the above-noted undesireable result, in accordance with the present invention, the changeover point may be shifted in a direction toward lower speed ratios thereby avoiding a dropping course of the power input curve by providing resilient means which support the movement of the movable stator blade into the clutch position.

With stator constructions of the present invention wherein the respective movable stator blade cooperates with the supporting hub by way of resilient means, the resilient means may be operatively inserted between the supporting hub and at least one movable stator blade in slide torsion spring ring lying perpendicularly and at least approximately centrally to the wheel axis may be in operative connection by means of its one spring end with the supporting hub and by means of its other spring end with a hub which hub is immovably fixed with respect to the movable stator blade. Such a construction is advantageous and the torsion spring ring utilized in such construction is distinguished by high spring forces and can be accommodated, without effort, in an annular space between a supporting hub and neighboring turbine wheel hub.

To advantageously mount one spring end of the torsion spring ring to a hub holding the movable stator blade, a set collar is disposed perpendicularly and centrally with respect to the wheel axis which set collar can be fixed in position at least in one direction of rotation with respect to the hub and can be connected to the spring end associated with the hub.

To effect a simple and rapid assembly of the spring mounting, a detachable shape-mating connection may be provided between the hub and the set collar.

Accordingly, it is an object of the present invention to provide a stator construction for a hydrodynamic torque converter which avoids, by simple means, shortcomings and disadvantages encountered in the prior art.

Another object of the present invention resides in providing a stator construction for a hydrodynamic torque converter which enables, in the clutch range, a high degree of efficiency and a high power input and, in the start up range, enables a high conversion rate and a power input rate adapted to the drive engine to which the hydrodynamic torque converter is connected.

Yet another object of the present invention resides in providing a stator constructions for a hydrodynamic torque converter which attains an advantageous fuel consumption and keeps heat losses at a minimum.

A further object of the present invention resides in providing a stator construction for a hydrodynamic torque converter which utilizes a change in flow direction of the hydraulic fluid between a start up and clutch range so as to automatically adjust movable stator blades with respect to the fixed stator blades.

A still further object of the present invention resides in providing a stator construction for a hydrodynamic torque converter which automatically changes the blade pitch in the start up range and clutch range operation of the torque converter.

Another object of the present invention resides in providing a stator construction for a hydrodynamic torque converter which minimizes the hydraulic losses in the clutch range operation of the torque converter.

Yet another object of the present invention resides in providing a stator construction for a hydrodynamic torque converter which enables the torque converter to have a variable power input rate in a start up range operation of the converter.

A further object of the present invention resides in providing a stator construction for a hydrodynamic torque converter which automatically changes from the start up range to the clutch range of operation without requiring expensive operating and control means.

Another object of the present invention resides in providing a stator construction for a hydrodynamic torque converter which is simple in construction and therefore relatively inexpensive to manufacture.

A still further object of the present invention resides in providing a stator construction for a hydrodynamic torque converter which enables the torque converter to function reliably under all operating conditions.

These and other objects, features, and advantages of the present invention will become more apparent from the following description when taken in connection with the accompanying drawings which show, for the purposes of illustration only, several embodiments in accordance with the present invention, and wherein:

Referring now to the drawings wherein like reference numerals are used throughout several view to designate like parts and, more particularly, to FIGS. 1, 9, 12 and 16, according to these figures, a hydrodynamic torque converter is provided which includes an internal hydrodynamic circuit positively produced, in a conventional manner, by a pump impeller generally designated by the reference numeral 42 with blades 43, a turbine or guide wheel generally designated by the reference numeral 44 with blades 45, as well as a stator generally designated by the reference numeral 46. An outer shell 47 of the pump impeller 42 is welded to a housing shell 48 extending over the turbine wheel 44 to establish a rotationally fixed connection to the crankshaft of the drive engine. The turbine wheel 44 may be connected by a riveted hub 49 and a splined-toothed coupling 50 with an input shaft of a change-speed gear transmission connected downstream in the power train. The stator 46 is provided with an internal supporting hub generally designated by the reference numeral 21 carrying blades generally designated by the reference numeral 67 which are fixedly disposed with respect to the hub 21. The supporting hub 21 is integrally fashioned with a drum 51 for receiving a free wheel clutch generally designated by the reference numeral 52. While an outer clamping ring 53 of the clutch 52 is rotationally fixedly connected by way of a splined-toothed coupling 54 to a drum 51, an internal clamping ring 55 may be non-rotatably connected by way of a hub 56 with a splined-toothed coupling 57 to a non-rotating stator shaft.

Figure 1:
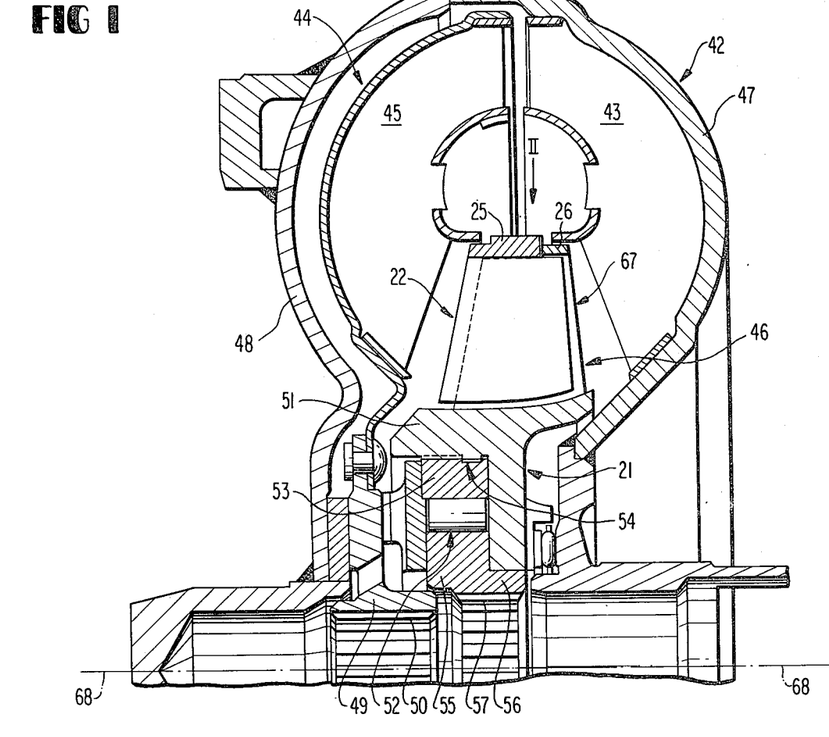
FIG. 1 is an axial cross-sectional view, containing a guide wheel axis, through a hydrodynamic torque converter provided with a stator construction in accordance with the present invention.
Figure 2:
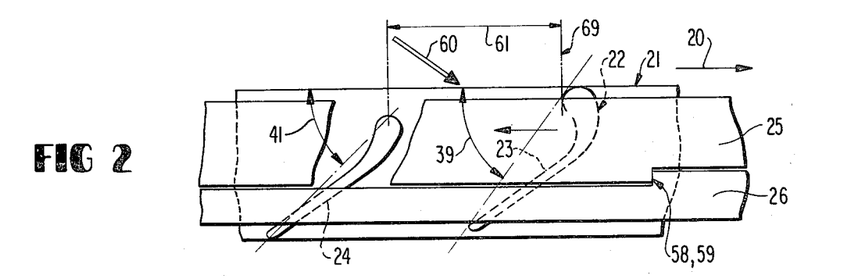
FIG. 2 is a top planar view of the stator construction of FIG. 1 taken in the direction of the arrow II, in planar projection rotated by 90° in the clockwise direction.
Figure 3:
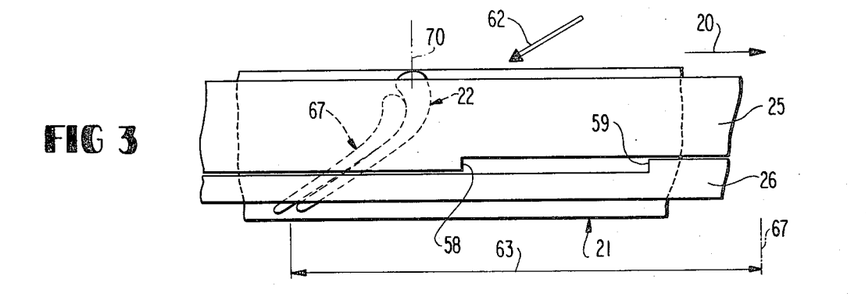
FIG. 3 is a top view corresponding to FIG. 2 illustrating the movable stator blades of the stator construction of the present invention in a different position.

In the stator construction of FIGS. 1-3, the stator 46 includes movable stator blades generally designated by the reference numeral 22 respectively arranged between two fixed stator blades 67. The stator blades 22 are fixedly mounted to an outer shroud ring 25. The shroud ring 25 is fixed to a further shroud ring 26 essentially immovable in the directions of the wheel axis 68—68 (FIG. 1). The further shroud ring 26 is attached to blade heads of the fixed stator blade 67. In a reactionary direction of rotation indicated by the arrow 20, the supporting hub 21 with its stator blades 67 and with the shroud ring 26 is non-rotatably fixed in position by the free wheel clutch 52.

As shown in FIG. 2, in a partial load position 69 of the movable stator blades 22, the shroud ring 25, fixedly joined to the movable stator 22, is in rigid contact in the reactionary direction of rotation 20 by engagement of a stop generally designated by the reference numeral 58 of the shroud ring 25 with a counter stop generally designated by the reference numeral 59 of the shroud ring 26. The partial load position 69 is assumed by the movable stator blade 22 under the effect of the hydraulic pressure of the hydraulic fluid in the start- up range. In the start up range, the flow direction of the hydraulic fluid is indicated by the arrow 60 and is directed as a so-called "kick in the belly" since the flow direction 60 is oriented toward a hollow 23 of the movable stator blade 22. In this manner, a narrow blade pitch results for the start up range between the respective fixed stator blade 67 and movable stator blade 22. In the clutch point range shown in FIG. 3, the hydraulic fluid flows in a direction indicated by the arrow 62 so that the stator blade 67 and 22 are under the effect of the flow of the hydraulic fluid in a so-called "kick in the back" direction.

Under the influence of the above-noted hydraulic pressure force at the respective blade profiles, the movable stator blade 22 is adjusted with its shroud ring 25 in a direction opposite to the reactionary direction of rotation 20 over a distance 61 into a clutch position 70 wherein the blade hollow 23 of the blade 22 hugs the correspondingly configured blade crest 24 of the fixed stator blade 67 facing the former blade in this direction of movement. In this manner, an enlarged blade pitch results for the clutch point range corresponding approximately to the constant blade pitch of the fixed stator blades 67.

Figure 4:
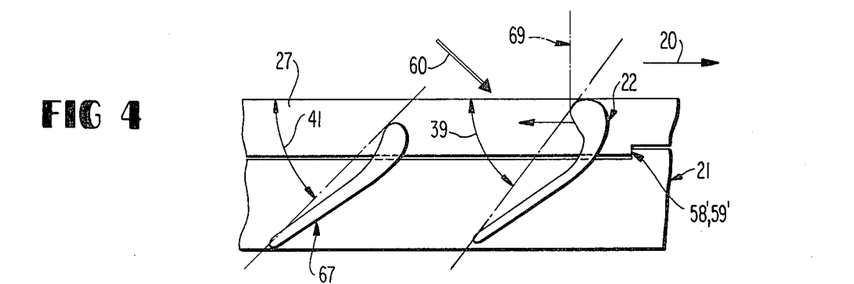
FIG. 4 is a top planar projection of a stator construction according to a further embodiment of the present invention.
Figure 5:
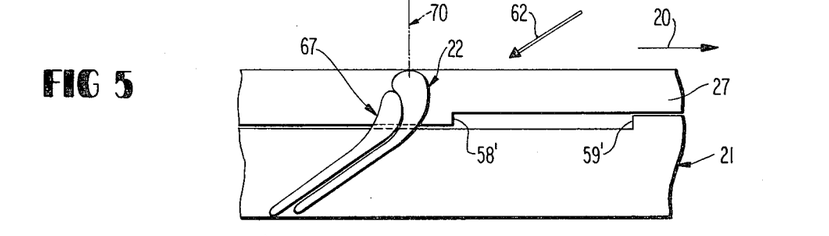
FIG. 5 is a top plan view corresponding to FIG. 4 with the movable stator blades in a different position.

The stator construction of FIGS. 4 and 5 correspond in arrangement and mode of operation to the movably provided stator blades 22 of the stator construction of FIGS. 1-3 wherein a respective movable stator blade 22 is arranged between two neighboring fixed stator blades 67 at the supporting hub 21. However, in contrast to the construction of FIGS. 1-3, each of the movable stator blades 22 are fixedly arranged on a hub 27 mounted, with a limited degree of rotatability, on the supporting hub 21. Additionally, in the construction of FIGS. 4 and 5, the movable stator blades 22 are maintained by stops 58' formed on the hub 28 and counter stops 59' formed on the supporting hub 21 in the start up range under the hydraulic pressure, i.e., the flow the hydraulic fluid in the direction 60 in a partial load position 69 with a narrow or dense blade pitch.

In the partial load position 69, as shown in FIG. 4, the movable stator blades 22 are located approximately centrally between two neighboring fixed stator blades 67 of the supporting hub 21. As with the construction of FIGS. 1-3, the movable stator blades 22 of FIGS. 4 and 5 are adjusted upon a change in the direction of flow of the hydraulic fluid from the flow direction 60 for the start up range into the flow direction 62 for the clutch range automatically by means of the stream of hydraulic fluid into a clutch position 70 as described hereinabove. Thus, the stator construction of FIGS. 4 and 5 differs from the stator construction of FIGS. 1-3 in that the movable stator blades 22 are mounted at a hub 27 having a limited degree of rotatability instead of being mounted to an outer shroud ring 25. The hub 27 may, for example, be supported with respect to the supporting hub 21 in a manner more fully described hereinbelow with respect to a hub 38 for the stator construction described in connection with FIGS. 9-11.

Figure 6:
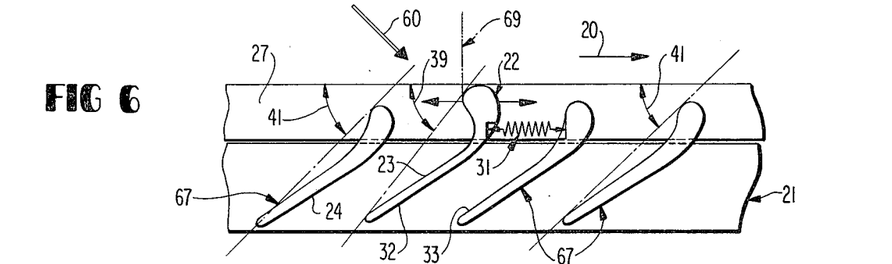
FIG. 6 is a top planar view of a stator construction in accordance with another embodiment of the present invention.
Figure 7:
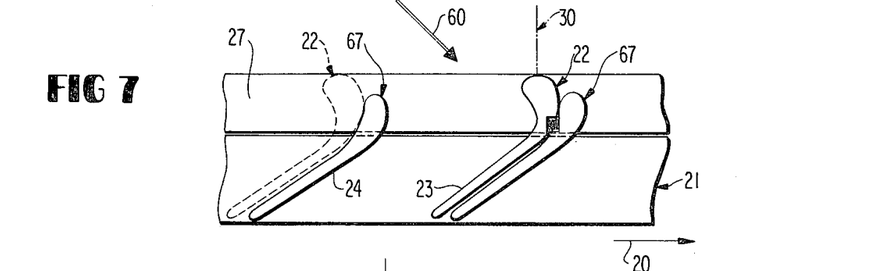
FIG. 7 is a top planar view corresponding to FIG. 6 with the movable stator blades of the stator construction of the present invention being in a different position.
Figure 8:
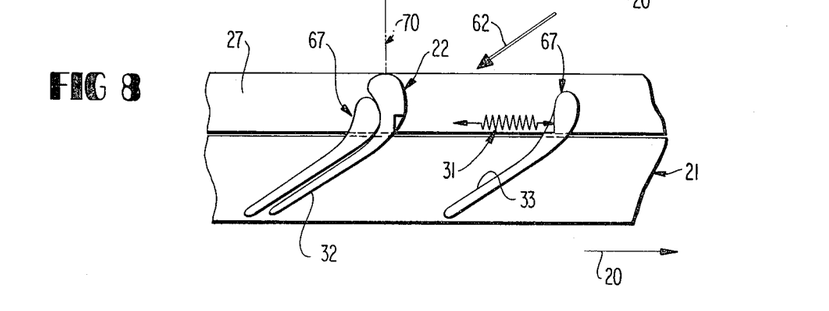
FIG. 8 is a top planar view corresponding to FIG. 6 with the movable stator blades being in a further position.

As shown in FIGS. 6-8, a stator construction is provided which differs from the stator construction of FIGS. 4 and 5 in that the movable stator blades 22 are supported, in a reactionary direction of rotation 20 with respect to the supporting hub 21, by resilient means 31 through the fixed stator blades 67 in order to fix the partial load position 69 of the stator blades 22. In this manner, the movable stator blades 22, again attached to a hub 27, change over or are displaced with a rising hydraulic pressure, i.e., the hydraulic fluid flows in a flow direction 60, into a full load position 30 (FIG. 7) in which the blade crests 32 of the movable stator blades 22 hug the correspondingly configured blade hollows 33 of the fixed stator blade 67. Upon a change in the direction of flow of the hydraulic fluid from the flow direction 60 in the start up range into the flow direction 62 of the clutch point range, as shown in FIG. 8, the movable stator blades 22 are moved by virtue of the impact of the hydraulic fluid on the crests of the movable stator blades 22 into the clutch position 70 wherein the blade hollows 23 hug the correspondingly configured blade crests 24 of the other fixed stator blades 67.

Thus, with the construction of FIGS. 6-8, the fixed stator blade 67 is proximate, in a peripheral direction of the axis 68—68, to the movable stator blade 22 and, in the other peripheral direction, to a further fixed stator blade 67, that is, the fixed stator blade cooperating with its blade hollow with the movable stator blade 22 is proximate, in the reactionary direction of rotation, to a further fixed stator blade 67 with the neighboring fixed stator blade 67 being different from each other with respect to blade inclination and profile configuration.

Figure 9:
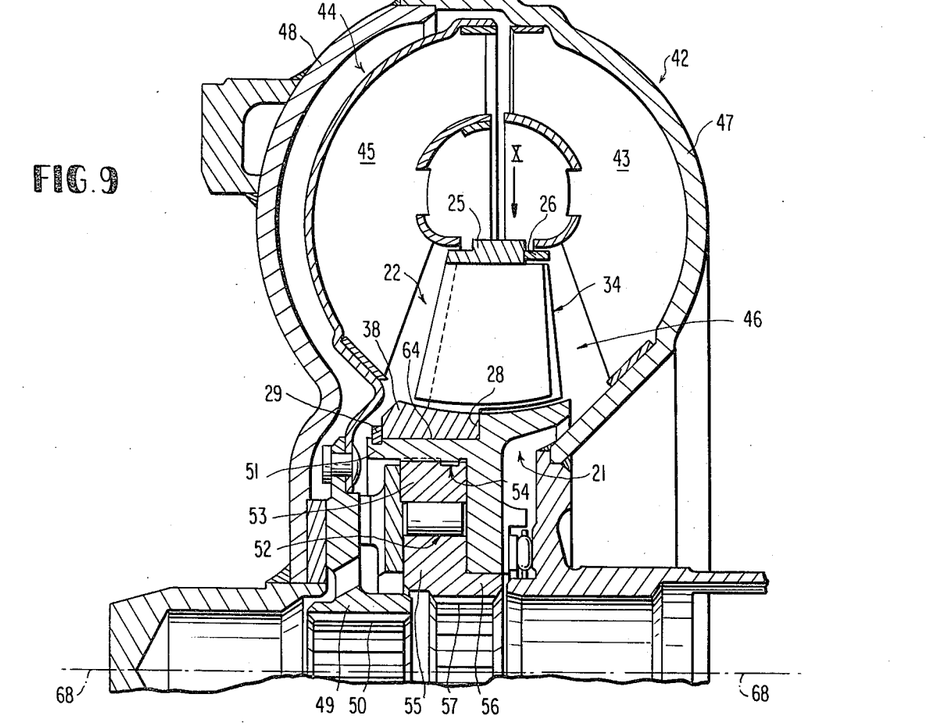
FIG. 9 is an axial cross-sectional view, containing a guide wheel axis, through a hydrodynamic torque converter provided with a stator construction in accordance with a further embodiment of the present invention.
Figure 10:
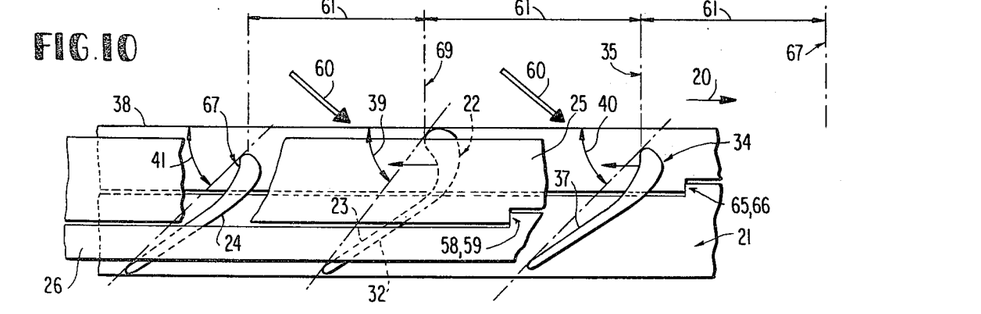
FIG. 10 is a top planar view of the stator of FIG. 9 taken in the direction of the arrow X, in a planar projection rotated by 90° in the clockwise direction.
Figure 11:
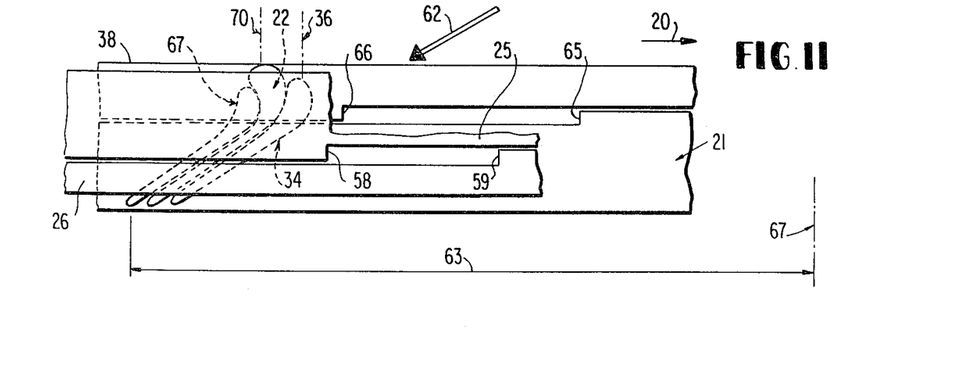
FIG. 11 is a view corresponding to FIG. 10 with the movable stator blades of the stator construction of the present invention in another position.
Figure 12:
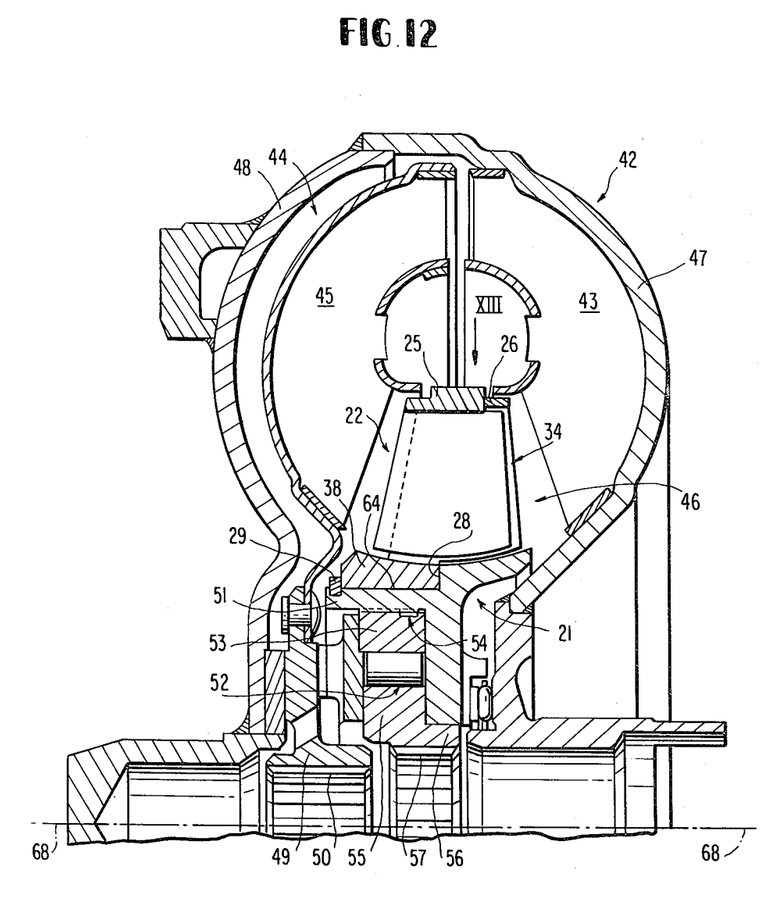
FIG. 12 is an axial cross sectional view, containing the guide wheel axis, through a hydrodynamic torque converter provided with a stator in accordance with yet another embodiment of the present invention.
Figure 13:
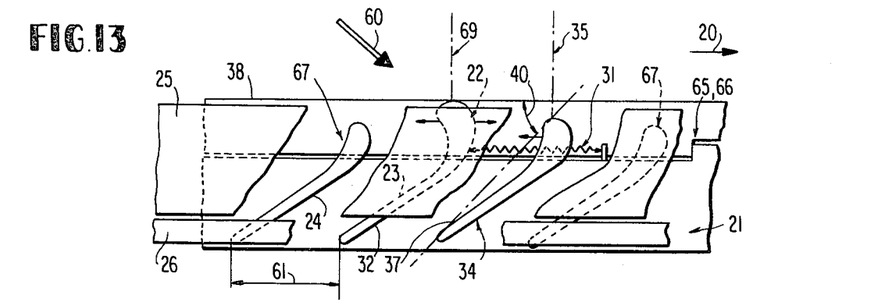
FIG. 13 is a top view of the stator of FIG. 12 taken in the direction of the arrow XIII in planar projection rotated by 90° in the clockwise direction.

In the stator construction of FIGS. 9-11, the movable stator blades 22, corresponding to the movable stator blades of the construction of FIGS. 1-3 are fixedly mounted to an outer shroud ring 25. The outer shroud ring 25 is, in turn, substantially immovably guided on a shroud ring 26 in the directions of the wheel axis 68—68. The shroud ring 26 is attached to the blade heads of the fixed stator blade 67 with the fixed stator blade 67 being, in turn, fixedly anchored on the supporting hub 21. When the reactionary direction of rotation 20, further movable stator blades generally designated by the reference numeral 34 are provided in front of the movable stator blades 22. The further movable stator blades 34 are fixedly anchored on a hub 38 and the hub 38 is mounted, with a limited degree of rotatability, on a cylindrical sliding bearing surface 64 of the drum 51. In one direction of the wheel axis 68—68, the hub 38 is fixed by a shoulder-like extension 28 and, in the other direction, by a mounting ring 29 with respect to the supporting hub 21. To fix the movable stator blades 22, disposed toward the rear, as viewed in the reactionary direction of rotation 20, in their partial load position 69, cooperating stops and counter stops generally designated by the reference numerals 58 and 59 are provided on the shroud rings 25 and 26. The movable stator blades 34 lying in the forward direction, as viewed in the reactionary direction of rotation 20 are fixed, in a partial load position 35, displaced with respect to the partial load position 69 in the reactionary direction of rotation 20, by cooperable stops 65 and counter stops 66 provided on the supporting hub 21 and hub 38. The movable stator blades 22 and 34 are maintained in the respective partial load positions 69, 35 by the effects of the pressure of the hydraulic fluid flowing in the flow direction 60.

As shown in FIG. 11, to enable the movable stator blades 22 and 34 to contact the fixed stator blade 67 in the clutch position 70, the blade hollow 23 is configured so as to accommodate the blade crest 24 of the forward fixed stator blade 67 and the hollow 37 of the movable stator blade 34 is configured so as to accommodate the blade crests 32 of the movable stator blade 22. When the movable stator blades 22, 34 are displaced forwardly or in a direction opposite the reactionary direction of rotation 20 by the effects of the hydraulic fluid flowing in the flow direction 62, the stator blades assume the position illustrated in FIG. 11. Thus, in the clutch range, the clutch position 36 of the forward movable stator blade 34 is slightly displaced by the thickness of the profile of the movable stator blade 22 with respect to the clutch position 70 of the rearward movable stator blade 22. The large blade pitch 63 resulting in the clutch range by the fan-like combining of the blades 67, 22, and 34 is about three-fold larger than the narrow blade pitch 61 in the start up range resulting from the partial load positions 69 and 35 of the movable stator blades 22 and 34.

Figure 14:
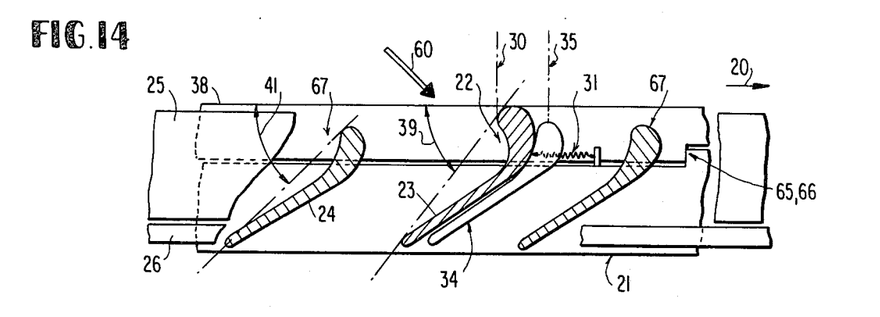
FIG. 14 is a top view corresponding to FIG. 13 with the movable stator blades of the stator construction of the present invention in another position.
Figure 15:
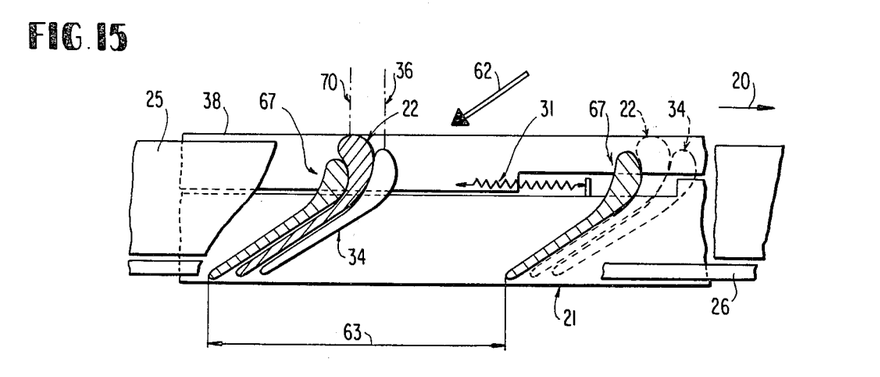
FIG. 15 is a top view corresponding to FIG. 13 with the movable stator blades in a further position.

The stator construction of FIGS. 12-15 differs from the construction of FIGS. 9-11 in that, instead of the rigid support by the stops and counter stops 58, 59 for the partial load position 69 of the rearward, movable stator blades 22, a resilient support 31 is provided in the reactionary direction of rotation 20 of the movable stator blades 22 with respect to the supporting hub 21 whereby, as shown in FIG. 14, a full load position 30 is obtained in the start up range for the rearward movable stator blades 22 corresponding to the embodiment of FIGS. 6-8 at rising hydraulic pressure. The stop for the full load position of the movable stator blade 34 is provided by stops and counter stops 65, 66 which fix the movable stator blade 34 with respect to the supporting hub 21 in the reactionary direction of rotation 20. After changing from the flow direction 60, in the start up range, to the flow direction 62 in the clutch range, the movable stator blades 22 and 34 contact, in a fan-like manner the fixed stator blades 67 lying in opposition to the reactionary direction of rotation 20 as shown in FIG. 15. In all other respects, the stator construction of FIGS. 12-15 is identical to the stator construction of FIGS. 9-11 so that an additional detailed description of the remaining corresponding components is deemed unnecessary.

As shown in the stator construction of FIGS. 16-19, the movable stator blades 22 are mounted in a fixed fashion on a hub 27 which is centered on the drum 51 so as to be rotatable and axially non-displaceable. The change over of the movable stator blades 22 from the partial load position 69 of FIG. 18 into the clutch position 70 of FIG. 19, due to a change from the afflux direction 60 of the hydraulic fluid into the afflux direction 62, is supported by resilient means generally designated by the reference numeral 71 inserted operatively between the supporting hub 21 and the hub 27.

Figure 16:
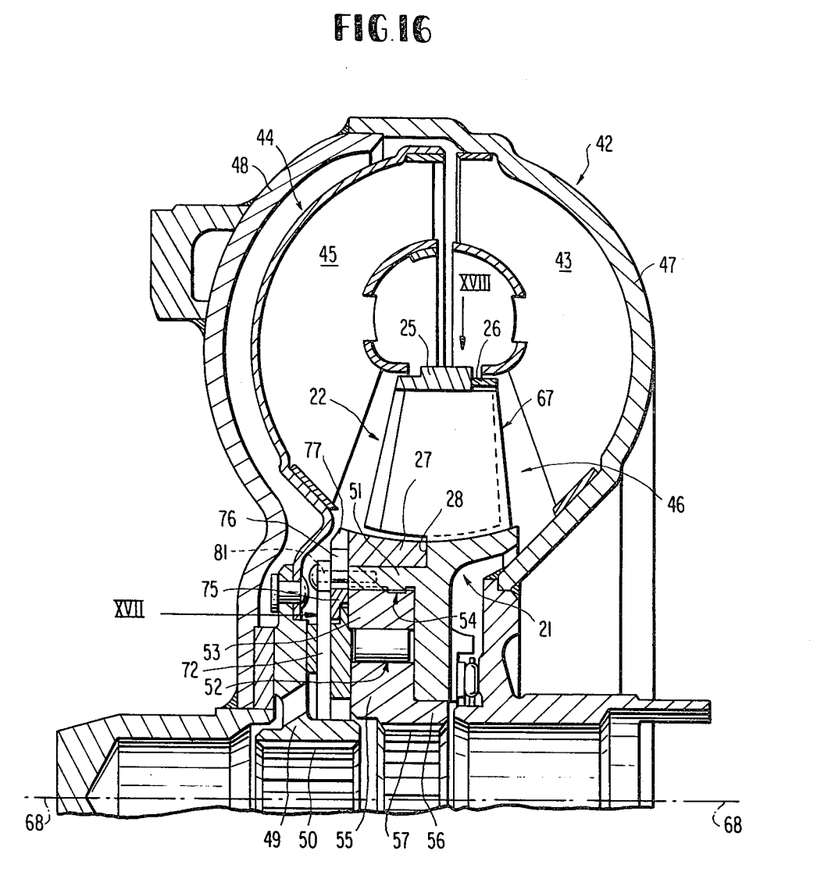
FIG. 16 is an axial cross-sectional view, containing a guide wheel axis, through a hydrodynamic torque converter in accordance with a still further embodiment of the present invention.
Figure 17:
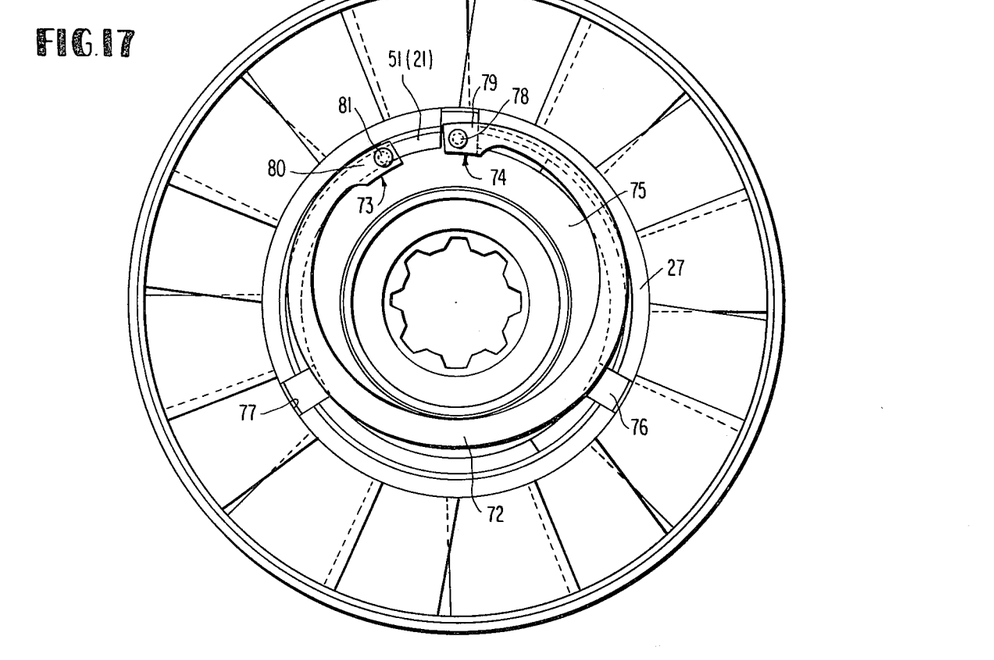
FIG. 17 is a front view of the hydrodynamic torque converter of FIG. 16 taken in the direction of the arrow XVII.
Figure 18:
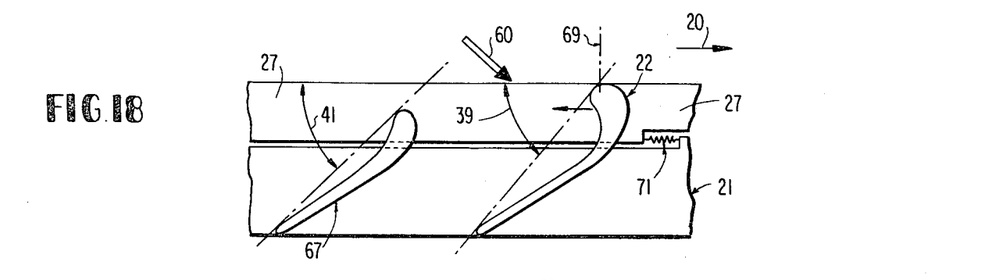
FIG. 18 is a view of the hydrodynamic torque converter of FIG. 16 taken in the direction of the arrow XVIII, in a planar projection rotated by 90° in the clockwise direction.
Figure 19:
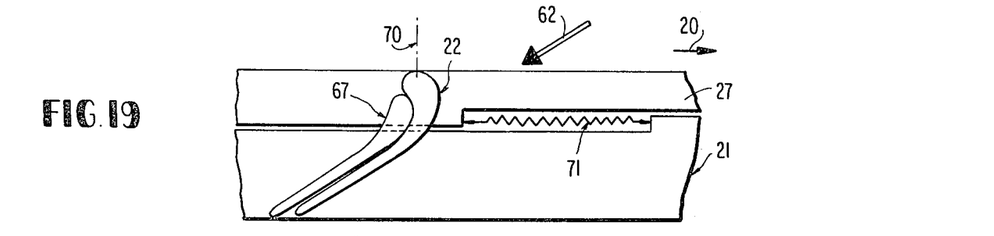
FIG. 19 is a planar projection of FIG. 18 with the movable stator blades of the stator construction of the present invention in another position.

FIGS. 16 and 17 provide one possibility for arranging and constructing the resilient means 71 and, according to these figures, a zone of the hub 27 projecting beyond the drum 51 is provided at an end face thereof with three cutouts 77 which respectively engage in a shape-mating and detachable fashion with a corresponding radial tongue 76 of a set collar 75 located laterally beside the outer clamping ring 53 (FIG. 16) concentrically to wheel axis 68—68. One of the tongues 76 is provided with a stay bolt 78 lying parallel to the wheel axis 68—68. The stay bolt 78 engages into a corresponding mounting eye 79 at one spring end generally designated by the reference numeral 74 of a slotted torsioned spring ring 72. Correspondingly, the other spring end generally designated by the reference numeral 73 of the slotted portion spring ring 72 has a mounting eye 80 engaged by a stay bolt 81 fixedly inserted in the end face of the drum 51.

In all of the stator constructions described hereinabove, a stagger angle 39 of the movable stator blades 22 is constant in all positions of the stator blades relative to the supporting hub 21 and the stagger angle 39 is larger than a stagger angle 41 of the fixed stator blade 67. However, the stagger angle 40 of the forward movable stator blades 34 of the construction of FIGS. 9-11 and FIGS. 12-15 is identical to the stagger angle 41 of the fixed stator blades 67.

In all of the above described stator constructions, the hugging or engagement of the blades over their entire height is made possible by respectively compensating for the difference in pitch between the hub and shroud ring by a corresponding blade inclination and by differently thick hubs and shroud ring profiles.

Depending on particular applications, it is of course possible to utilize one or several features of the respective stator constructions of the present invention in one or several of the other stator constructions.

While I have shown and described several embodiments in accordance with the present invention, it is understood that the same is not limited thereto but is susceptible of numerous changes and modifications as known to one having ordinary skill in the art, and I therefore do not wish to be limited to the details shown and described herein, but intend to cover all such modifications as are encompassed by the scope of the appended claims.

What is claimed is:

1. A stator construction for a hydrodynamic torque converter, the stator construction including a plurality of spaced stator blades fixedly arranged on a supporting hub, and means for non-rotatably fixing the supporting hub in position in a reactionary direction of rotation of the torque converter, characterized in that at least one further stator blade is arranged between two adjacent fixed stator blades, means are provided for movably guiding the at least one further stator blade on the supporting hub for movement along a path of revolution concentric to a pump wheel axis of the hydrodynamic torque converter between a central partial load position and a clutch position in proximity to one of the adjacent fixed stator blades lying rearwardly as viewed in the reactionary direction of rotation, the at least further stator blade includes a blade hollow facing in a direction opposite the reactionary direction of rotation, each of the fixed stator blades includes a blade crest, the blade hollow of the at least one further stator blade is configured so as to accommodate the blade crest of the adjacent fixed stator blade lying rearwardly as viewed in the reactionary direction of rotation so as to enable the blade surfaces of the at least one further stator blade to engage blade surfaces of the last-mentioned fixed stator blade along an entire length thereof such that the at least one further stator blade and the last-mentioned fixed stator blade function as a stop and counter-stop defining the clutch position and change a pitch of the stator blades, and in that stop means are provided for fixing the at least one further stator blade in the central partial load position.

2. A stator construction according to claim 1, characterized in that the means for movably guiding the further stator blade includes at least one shroud ring, the at least one further stator blade is mounted on said shroud ring, and in that the at least one shroud ring is mounted on the supporting hub for limited movability.

3. A stator construction according to claim 2, characterized in that a further shroud ring is fixedly mounted on the supporting hub, and in that the at least one shroud ring is guided on the further shroud ring in at least one direction of the pump wheel axis.

4. A stator construction according to claim 1, characterized in that the means for movably guiding the further stator blade includes a further hub mounted for limited rotatability on the supporting hub.

5. A stator construction according to claim 4, characterized in that the supporting hub includes a shoulder-like extension for guiding the further hub in one direction of the pump wheel axis.

6. A stator construction according to claim 5, characterized in that a mounting ring is provided on the supporting hub for guiding the further hub in the other direction of the pump wheel axis.

7. A stator construction according to claim 6, characterized in that the at least one further stator blade is movably guided from the central partial load position to a full load position in proximity to the other adjacent fixed stator blade lying forwardly as viewed in the reactionary direction of rotation, and in that the stop means stop the further stator blade in the partial load position in dependence upon a reaction moment of the supporting hub, said stop means being brought into a release position so as to produce movement of the movable stator blade toward the full load position upon the reaction moment exceeding a predetermined value.

8. A stator construction according to claim 7, characterized in that the stop means includes a resilient means operatively interposed between the further stator blade and the supporting hub.

9. A stator construction according to claim 8, characterized in that the resilient means is constructed as a compression spring.

10. A stator construction according to claim 7, characterized in that the further stator blade includes a blade crest, the fixed stator blade lying forwardly as viewed in the reactionary direction of rotation includes a blade hollow configured so as to accommodate the blade crest of the further stator blade so as to enable blade surfaces of said last-mentioned fixed stator blade and further stator blade to engage substantially along an entire length of the last-mentioned fixed stator blade such that the further stator blade and last-mentioned fixed stator blade function as a stop and counterstop defining the full load position.

11. A stator construction according to claim 1, characterized in that at least one additional stator blade is disposed between the further stator blade and the fixed stator blade lying forwardly as viewed in the reactionary direction of rotation, means are provided for movably guiding said additional stator blade on the supporting hub so as to be movable along a path of revolution concentric to the pump wheel axis of the hydrodynamic torque converter between a central partial load position located offset with respect to the central partial load position of the further stator blade and a clutch position in proximity to the fixed stator blade lying rearwardly as viewed in the reactionary direction of rotation.

12. A stator construction according to claim 11, characterized in that the additional stator blade is rigidly supported with respect to the supporting hub in a partial load position.

13. A stator construction according to claim 12, characterized in that the further stator blade includes a blade crest, the additional stator blade includes a blade hollow configured so as to accommodate the blade crest of the further stator blade so as to enable blade surfaces of the further and additional stator blades to function as a stop and counter-stop defining the clutch position.

14. A stator construction according to claim 13, characterized in that the additional stator blade supports the further stator blade on the supporting hub in the full load position.

15. A stator construction according to claim 14, characterized in that the means for movably guiding the additional stator blade includes an annular blade carrier disposed so as to be rotatable within limits with respect to the supporting hub but essentially immovable in the directions of the pump wheel axis.

16. A stator according to claim 15, characterized in that the means for removably guiding the further stator blade includes a shroud ring, the annular blade carrier is constructed as a hub, and in that the hub is narrower than the shroud ring.

17. A stator construction according to claim 16, characterized in that at least one of the additional and further stator blades has a uniform stagger angle.

18. A stator according to claim 16, characterized in that the stagger angle of at least one of the additional and further stator blades differs from a stagger angle of the fixed stator blades.

19. A stator construction according to claim 16, characterized in that at least one of the further and additional stator blades lies in a lattice work of the fixed stator blades.

20. A stator construction according to claim 1, characterized in that a drum means is provided for receiving a free-wheel clutch, the drum means is non-rotatably mounted with respect to the supporting hub, and in that the means for movably guiding the at least one further stator blade is a hub supported on the drum.

21. A stator construction according to claim 1, characterized in that one of the fixed stator blades is proximate, in one peripheral direction of the pump wheel axis to the further stator blade, and, in the other peripheral direction of the pump wheel axis, to a further fixed stator blade.

22. A stator construction according to claim 1, characterized in that resilient means are provided for supporting the movement of the further stator blade into the clutch position.

23. The stator construction according to claim 1, characterized in that a resilient means is operatively inserted between the supporting hub and the at least one further stator blade, and in that a slotted torsion spring ring lying perpendicularly and at least approximately centrally to the pump wheel axis is provided, one spring end of the slotted torsion spring ring being connected to the supporting hub and the other spring end of the slotted torsion spring ring being connected to a further hub immovably fixed with respect to the at least one further stator blade.

24. A stator construction according to claim 23, characterized in that a set collar disposed perpendicularly and centrally with respect to the wheel axis is provided, said set collar being adapted to be fixed in position at least in one direction of rotation with respect to the further hub and adapted to be connected to the end of the slotted torsion spring ring connected to the further hub.

25. A stator construction according to claim 24, characterized in that a detachable shape-mating connection means is disposed between the further hub and the set collar.

26. A stator construction according to claim 1, characterized in that the means for movably guiding the further stator blade includes a further hub mounted for limited rotatability on the supporting hub.

27. A stator construction according to claim 26, characterized in that the supporting hub includes a shoulder-like extension for guiding the further hub in one direction of the pump wheel axis.

28. A stator construction according to claim 27, characterized in that a mounting ring is provided on the supporting hub for guiding the further hub in the other direction of the pump wheel axis.

29. A stator construction according to claim 1, characterized in that the further stator blade is movably guided from a partial load position to a full load position in proximity to the other adjacent fixed stator blade lying forwardly as viewed in the reactionary direction of rotation, and in that the stop means stop the further stator blade in the partial load position in dependence upon a reaction moment of the supporting hub, said stop means being brought into a release position so as to produce movement of the movable stator blade toward the full load position upon the reaction moment exceeding a predetermined value.

30. A stator construction according to claim 29, characterized in that the stop means includes a resilient means operatively interposed between the further stator blade and the supporting hub.

31. A stator construction according to claim 29, characterized in that the further stator blade includes a blade crest, the fixed stator blade lying forwardly as viewed in the reactionary direction of rotation includes a blade hollow configured so as to accommodate the blade crest of the further stator blade so as to enable the blade surfaces of said last-mentioned fixed stator blade and further stator blade to engage substantially along an entire length of the last-mentioned fixed stator blade such that the further stator blade and last-mentioned fixed stator blade function as a stop and counter-stop defining the full load position.

32. A stator blade according to claim 1, characterized in that at least one further stator blade has a uniform stagger angle.

33. A stator construction according to claim 1, characterized in that a stagger angle of the at least one further stator blade differs from a stagger angle of the fixed stator blades.

34. A stator construction according to claim 1, characterized in that the at least one further stator blade lies in a lattice work of the fixed stator blades.

* * * * *